INVENTOR
RANDAL J. COLVERT
BY
Joseph A. Fenlon
ATTORNEY

United States Patent Office

3,539,990
Patented Nov. 10, 1970

---

3,539,990
MEANS AND METHODS FOR VALIDATING CREDIT CARDS
Randal J. Colvert, St. Louis, County, Mo., assignor of twenty percent to Joseph A. Fenlon, St. Louis County, Mo.
Filed Aug. 3, 1966, Ser. No. 569,901
Int. Cl. H04q 1/20; G11b 5/00
U.S. Cl. 340—149
9 Claims

---

ABSTRACT OF THE DISCLOSURE

This invention relates to a credit card validating system which enables an operator to set manually on a control panel any given card number, and to compare that given number, through electronic digital comparison techniques and a new and unique plus coded tape approach, against a list of prerecorded card numbers which are to be dishonored. The comparison is made on a digit by digit match basis for each digit in each sequence against the given number, with automatic resequencing at the end of each preselected number.

---

Figure 1A:
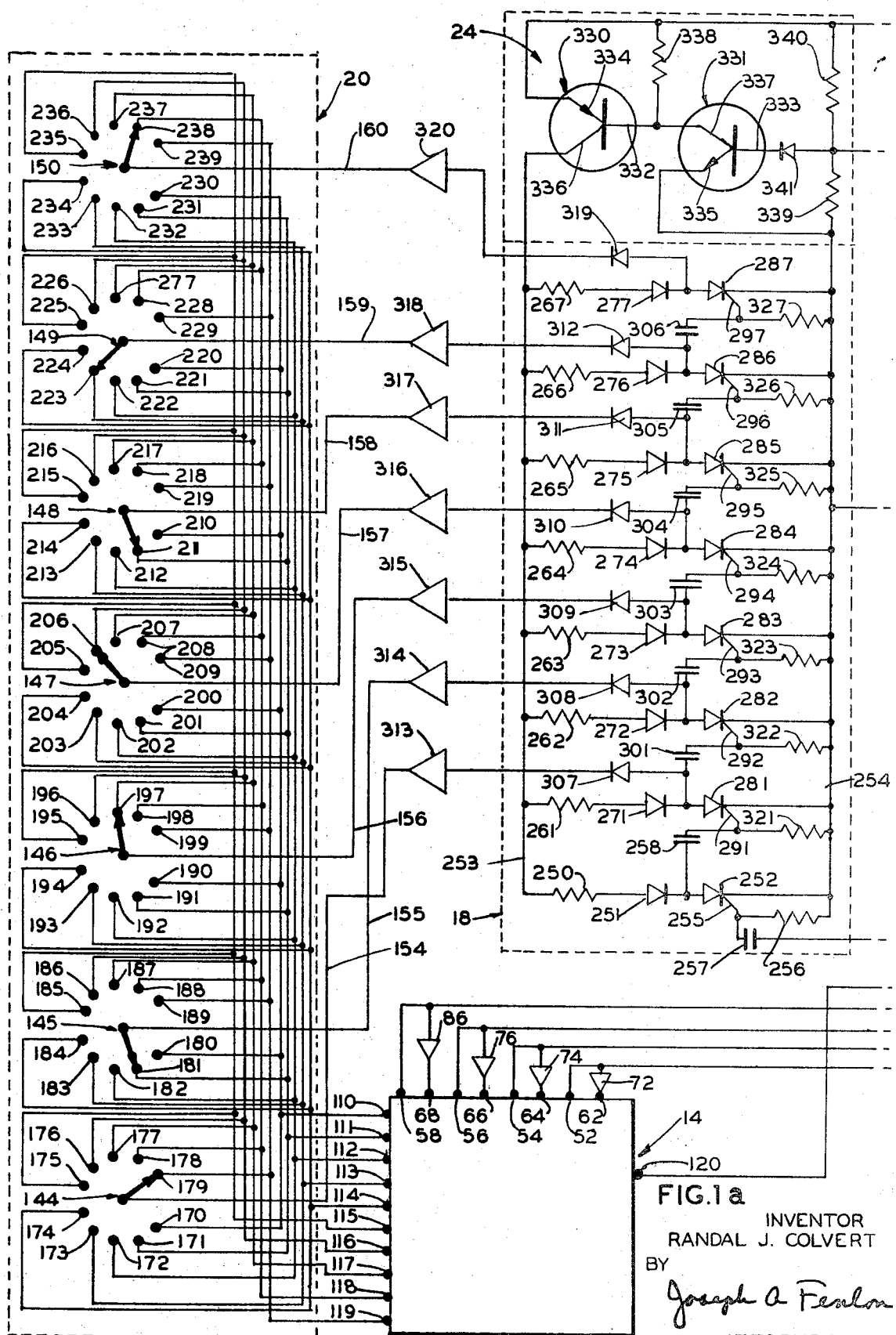

This invention relates to sequential comparators.

With the rapid growth of the use of the credit card, retailers are faced with a plethora of credit card abusers. To protect themselves, the credit card agencies publish periodically lists of credit cards which their respective retailers should dishonor. However, the lists have become so voluminous that it is becoming impractical for each retailer to check the list each time a card is presented. In addition, the lists are subject to both printer and reader error.

It is the object of this invention to provide a machine which will tell the operator in a matter of a few seconds whether or not a particular card is to be honored.

With the above and other objects in view, which will become immediately apparent upon reading the specification, my invention resides in the unique and novel form, construction, arrangement and combination of parts and steps described in the annexed specification, drawings and claims.

Figure 1B:
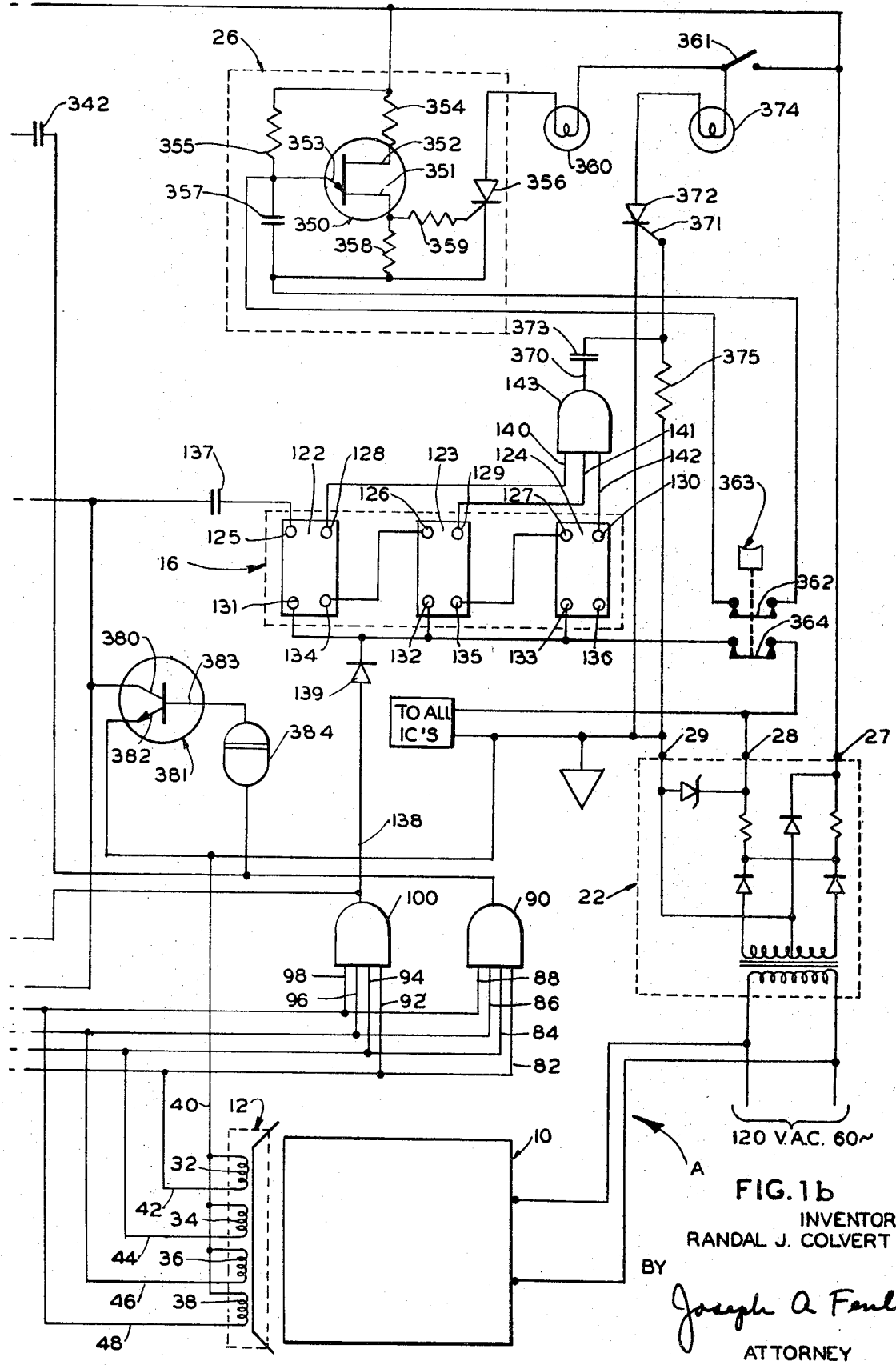
Figure 2:
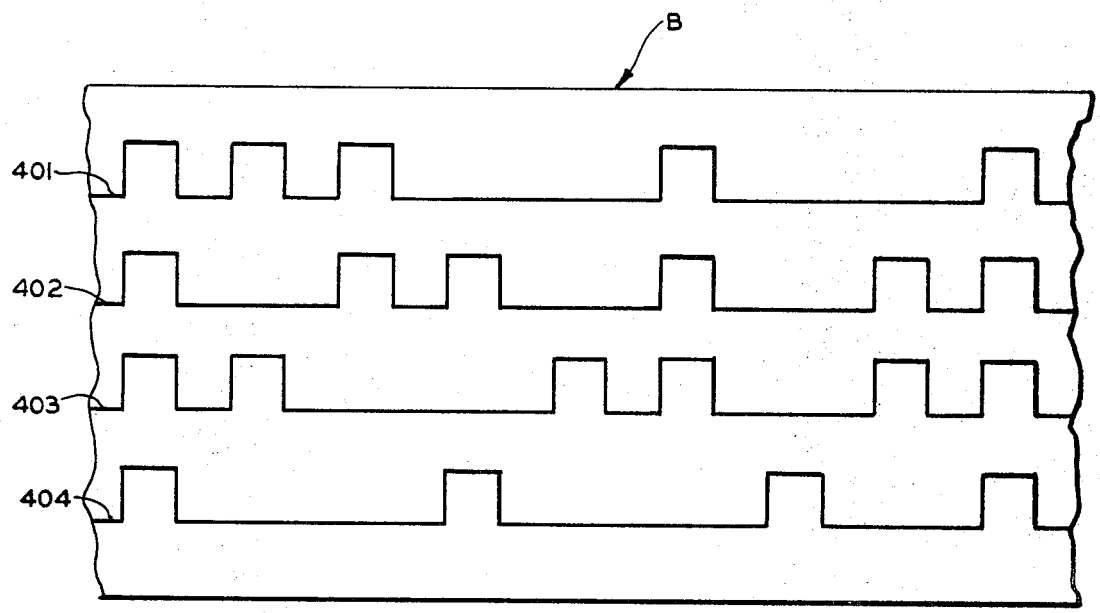

In the drawings:

FIGS. 1a and 1b comprise an electrical schematic diagram of the present invention;

FIG. 2 is a representative drawing of one sequence of numbers as presented on the precoded tape.

Referring now in more detail and by reference character to the drawings which illustrate a preferred embodiment of my invention, A designates a credit card validating machine which includes a tape deck 10, a four track reading head 12, a decode matrix 14, a comparison counter 16, a digit counter 18, a card reader 20, a power supply 22, a digital sequencer 24, and a sampling timer 26. For purposes of illustration, and not limitation, the credit card will be considered as having a seven digit number, it being understood that the number of digits interrogated will have no effect in the operation of the invention.

The power supply 22 conventionally provides a +12 volt terminal 27, a +5 volt terminal 28, and a ground terminal 29.

The four track reading head 12 is conventionally connected to four amplifiers 32, 34, 36, 38, and a common ground 40; the amplifiers 32, 34, 36, 38 are respectively connected to lines 42, 44, 46, 48 which are respectively connected to each the following in the respective orders:
(a) To input terminals 52, 54, 56, 58 of the decode matrix 14;
(b) To input terminals 62, 64, 66, 68 of the decode matrix 14 through inverters 72, 74, 76, 78;
(c) To input terminals 82, 84, 86, 88 of the "OR" gate 90; and
(d) To input terminals 92, 94, 96, 98 of the "AND" gate 100.

The decode matrix 14 is a conventional four bit excess three decode matrix having line input terminals 52, 54, 56, 58; inverted line input terminals 62, 64, 66, 68; digital terminals 110, 111, 112, 113, 114, 115, 116, 117, 118, and 119; and an output terminal 120.

The comparison counter 16 comprises three flip-flop circuits 122, 123, 124, each respectively provided with input terminals 125, 126, 127; with output terminals 128, 129, 130; with reset terminals 131, 132, 133; and with forwarding terminals 134, 135, 136. The input terminal 125 of the flip-flop circuit 122 is connected to the output terminal 120 of the decode matrix through a capacitor 137. The input terminal 126 of the flip-flop circuit 123 is connected to the forwarding terminal 134 of the flip-flop circuit 122. The input terminal 127 of the flip-flop circuit 124 is connected to the forwarding terminal 135 of the flip-flop circuit 123. The forwarding terminal 136 of the flip-flop circuit 124 is open. The reset terminals 131, 132, 133, are all connected to each other and to the output terminal 138 of the "AND" gate 100 through a diode 139. The output terminals 128, 129, 130 are each respectively connected to input terminals 140, 141, 142 of a second "AND" gate 143.

The card reader 20 comprises seven manually operable numbered dial switches 144, 145, 146, 147, 148, 149, 150, each respectively provided with an input terminal 154, 155, 156, 157, 158, 159, 160 and ten output terminals 170 through 179 inclusive, 180 through 189 inclusive, 190 through 199 inclusive, 200 through 209 inclusive, 210 through 219 inclusive, 220 through 229 inclusive, 230 through 239 inclusive. The output terminals 170, 180, 190, 200, 210, 220 and 230 are all connected to each other and to the digital terminal 110 of the decode matrix 14. Similarly, the output terminals 171, 181, 191, 201, 211, 221, 231 are all connected to each other and the digital terminal 111; the output terminals 172, 182, 192, 202, 212, 222, 232 are all connected to each other and the digital terminal 112; the output terminals 173, 183, 193, 203, 213, 223, 233 are connected to each other and the terminal 113; the output terminals 174, 184, 194, 204, 214, 224, 234 are connected to each other and the terminal 114; the terminals 175, 185, 195, 205, 215, 225, 235 are connected to each other and the terminal 115; the terminals 176, 186, 196, 206, 216, 226, 236 are connected to each other and the terminal 116; the terminals 177, 187, 197, 207, 217, 227, 237 are connected to each other and the terminal 117; the terminals 178, 188, 198, 208, 218, 228, 238 are connected to each other and the terminal 118; and the terminals 179, 189, 199, 209, 219, 229, 239 are connected to each other and the terminal 119.

The digit counter 18 comprises an eight stage counter, each stage being substantially identical to the other stages. The first stage comprises a resistor 250 in series with a diode 251 and a silicon controlled rectifier 252 between buses 253 and 254. The silicon controlled rectifier includes a gate lead 255. Connected to the gate lead 255 and the bus 254 is a resistor 256. The gate lead 255 is also connected to the output terminal 138 of the "AND" gate 100 through a capacitor 257. The output of the first stage is connected to the input of the second stage (the gate lead 291) through capacitor 258. After the first stage should be an additional stage for each switch in the card reader 20. The second through eighth stages each comprise respectively a resistor 261, 262, 263, 264, 265, 266, 267 in series with a diode 271, 272, 273, 274, 275, 276, 277 and a silicon controlled rectifier 281, 282, 283, 284, 285, 286, 287, respectively between the buses 253, 254.

The output of the second through seventh stages is fed to the gate leads 292, 293, 294, 295, 296, 297 of the silicon controlled rectifiers 282, 283, 284, 285, 286, 287, through capacitors 301, 302, 303, 304, 305, 306 and to the input terminals 154, 155, 156, 157, 158 159 of the switches 144, 145, 146, 147, 148, 149 through diodes 307, 308, 309, 310, 311, 312 respectively and through inverter 313, 314, 315, 316, 317, 318 respectively. The output of the last stage is fed to the input terminal 160 of the switch 150 through diode 319 and inverter 320. The gate leads 291, 292, 293, 294, 295, 296, 297 are each respectively connected to the bus 254 through resistors 321, 322, 323, 324, 325, 326, 327.

The digital sequencer 24 comprises a pair of transistors 330, 331, each respectively including a base 332, 333, an emitter 334, 335 and a collector 336, 337. The collector 336 of the transistor 330 is connected to the bus 253. The emitter 334 of the transistor 330 is connected to power supply terminal 27. The base 332 is connected to the emitter 334 through a resistor 338 and is also connected directly to the collector 337 of the transistor 331. The emitter 335 is connected to the bus 254. The bus 254 is connected to power supply terminal 27 through two resistors 339, 340 in series. The base 333 is connected to the juncture of the resistors 339, 340, through a diode 341, and is also connected through a capacitor 342.

The sampling timer 26 comprises a unijunction transistor 350 including base leads 351, 352, and emitter lead 353. The base lead 352 is connected to power supply terminal 27 through resistor 354. The emitter 353 is connected to power supply terminal 27 through a resistor 355 and is also connected to the cathode of a silicon controlled rectifier 356 through a capacitor 357. The base lead 351 is connected to the cathode of the rectifier 356 through a resistor 358 and is also connected to the gate lead of the rectifier 356 through a resistor 359. The anode of the rectifier 356 is connected in series with a timing lamp 360 and a normally closed manual switch 361 to power supply terminal 27. The capacitor 357 is shunted by one normally closed pole 262 of a spring biased manually operable double pole single throw switch 363, the second pole 364 of which is also normally closed and which connects the reset terminals 131, 132, 133 of the flip-flop circuits 122, 123, 124 with a power supply terminal 28.

The output terminal 370 of the "AND" gate 143 is connected to the gate lead 371 of a silicon controlled rectifier 372 through a capacitor 373. The gate lead 371 is also connected to ground through a resistor 375. The cathode of the rectifier 372 is grounded. The anode of the rectifier is connected in series with a reject lamp 374, the switch 361, and power supply terminal 27.

Connected to the output terminal 120 of the decode matrix 14 is the collector 380 of a transistor 381 which also includes a grounded emitter 382 and a base which is connected to the output terminal 138 of the "AND" gate 100 through an astable multivibrator 384 set to have a two microsecond time delay.

The tape deck 10 is conventional and has the conventional gear (not shown) required to drive an endless band (not shown) of four track precoded tape past the reading heads 12. The bits of information on the tape are binary excess three coded and each card number precoded on the tape is set out in eight bits of information, one bit for each of the seven digits in the sample card and a marker bit for each sequence of digits. The marker bit comprises a one in each track which does not correspond to any digit the matrix decoder will pass.

To use the validater A, the operator manually sets the numbered dial switches 144, 145, 146, 147, 148, 149, 150 to correspond with the digits on the number on the face of the credit card to be validated. The switch 361 is closed, the tape (not shown) is started running through the reading heads, and the switch 363 is manually depressed and held down against the spring bias.

Each sequence of digits on the tape must be compared sequentially with the manually set sequence of digits on the switches 144, 145, 146, 147, 148, 149, 150. Control of the sequencing is achieved through the digit counter 18. The stages of the digit counter are normally non-firing when the validater is turned on. The first stage silicon controlled rectifier 252 fires when there is a pulse on all four sampled lines which occurs only when there is a market presented to the "AND" gate 100. This condition occurs only with the marker pulse and only once for each sequence of digits on the tape. With an output present on the "AND" gate 100, the rectifier 252 and the transistor 330 in the time control unit 24 go into conduction.

Clock is derived from the "OR" gate 90. Note that with an excess three code, there will be a pulse on at least one of the four lines for any digit between zero (which is coded three) and nine (which is coded twelve); there will also be a pulse on each of the lines when the marker is on the lines 42, 44, 46, 48. It should thus be apparent that by using an excess three code system with a marker as thus described, the output of the "OR" gate will be a continuous square wave from which clock may be derived.

The output of the "OR" gate 90 is applied to the base 333 of the transistor 331 through the capacitor 342 and causes the regular interruption of the time control unit 24 with each sequence of pulses presented along the lines 42, 44, 46, 48.

As the time control unit 24 is cut off, the rectifier 252 stops conducting but the capacitor 258 retains its charge, and passes the charge to the next stage of the digit counter between consecutive clock pulses from the "OR" gate 90 when the time control unit 24 returns to the operative condition. This places the silicon controlled rectifier 281 into conduction placing a charge on the capacitor 301 and an inverted signal on the input terminal 154 of the switch 144. This inverted signal is fed through the switch 144 to the particular input terminal of the decode matrix 14 which corresponds to the first credit card number as manually preset on the switch 144. If the coded number on the tape corresponds with the number set on the switch 144, a pulse will be passed to the output terminal 120 of the decode matrix 14. If there is a mismatch, there will be no such pulse. The transistor 381 is normally conducting and during conduction the output terminal 120 of the decode matrix 14 is at ground potential. The transistor 381 is placed into non-conduction two microseconds after each time the "OR" gate output activates the multivibrator 384 and the transistor 381 is then held in non-conduction for the remainder of the existence of the "OR" gate signal. During such non-conduction, the output terminal 120 is charged by the pulse, if any, passed by the decode matrix 14 and the pulse is transmitted to the comparison counter 16 through the capacitor 137.

Each time a pulse is passed through the capacitor 137, one or more of the flip-flop circuits 122, 123, 124 is triggered in binary fashion. Each time a coded digit passes along the lines 42, 44, 46, 48, the "OR" gate 90 output moves the digit counter 18 to a succeeding stage in the same manner and presents a succeeding manually selected digit to the decode matrix 14 through one of the switches 145, 146, 147, 148, 149, 150. If all digits of any given sequence correspond to any precoded sequence on the tape, the three flip-flop circuits 122, 123, 124 will all register positive and the "AND" gate 143 will present a voltage to the gate lead which will cause the silicon controlled rectifier 372 to conduct and the reject lamp 374 to become illuminated. Once the silicon controlled rectifier 372 conducts, the current cannot be stopped until the switch 361 is opened. Each firing of the "AND" gate 100 resets the flip-flop circuits 122, 123, 124, thus insuring that the lamp 374 lights only if the manually selected seven digit sequence corresponds exactly to one of the preselected seven digit sequences on the tapes. The lighting of the reject lamp 374 thus indicates to the operator that the manually set seven digit number corresponds with one of the precoded seven digit numbers on the tape and the card should be dishonored.

The output of the "AND" gate 100 resets the flip-flop circuits 122, 123, 124 each time a marker is presented to the lines 42, 44, 46, 48, clearing any pre-existing flip-flop condition caused by the preceding sequence of numbers, and insuring that the reject lamp 374 will light only if the sequence of digits manually set corresponds exactly with one precoded sequence of digits.

The number of sequences that can be set on any one tape is limited only by the size of the tape used, but in one revolution of a band of tape approximately 30 inches long, 3000 account numbers can be stored and tested against any manually offered number in a few seconds.

If more than seven digits are contained in any number to be tested, additional flip-flop circuits can be added to the comparison counter 16, the input leads to the "AND" gate 143 can be rearranged to cause the reject lamp 374 to become lighted in the manner previously explained when a precoded sequence matches the interrogated sequence exactly, additional switches can be added to the card readers, and additional stages aded to the digit counter 18. These modifications to increase the size of the sequence fall within the scope of the present state of the art.

The sampling timer 26 is used to advise the operator when all numbers coded on the tape have been tested Until the spring biased switch 363 is depressed, the flip-flop circuits 122, 123, 124 are held inoperative by the existence of the 5 v. D.C. presented to the reset terminals 131, 132, 133, from the power supply terminal 28. Once the switch 363 is depressed, the flip-flop circuits 122, 123, 124 will operate freely as previously described. In addition, depressing the switch 363 will cause the capacitor 357 to start charging, and when the capacitor 357 reaches a charge sufficient for the transistor 350 to go into conduction, the timing lamp 360 will light. The time required for the timing lamp 360 to light is governed by the RC consent of capacitor 357 and the resistor 358, and can be set to occur at a time sufficiently long to insure that the tape has made at least one complete revolution on the tape deck 10. When the operator has held the switch 363 down and the timing lamp 360 has lighted, the operator can thus be sure all precoded numbers have been tested. If the reject lamp 374 is unlighted, the operator knows the credit card should be honored.

The power supply 22 is also conventionally used to supply power to the inverter and amplifier circuits which are conventional.

Referring more to FIG. 2, B designates a portion of a tape on which is presented a precoded sequence. The top line 401 represents 2 to the 0 power. The next lower line 402 represents 2 to the first power. The line 403 represents 2 to the second power. The bottom line 404 represents 2 cubed. The sample number (using excess three code) is 2071453. Note that the markers correspond to the number 12 (in excess three) which the decode matrix 14 would reject.

The above described invention eliminates the need for parity and provides the only system known for comparing sequences of numbers in a four track system.

The above described invention is also unique in that it compares each complete digit in sequence, one comparison being made for every clock time, and eliminates the need for internal binary storage.

It should be understood that changes, alterations and modifications in the form, construction, arrangement and combination of the various parts and steps of my invention may be made and substituted for those herein shown without departing from the nature and principle of my invention.

Having thus described my invention, what I claim and desire to secure by Letters Patent is set forth in the following claims:

1. A method for comparing a given sequence of digits with a series of preselected sequences of digits, which method comprises recording each of the preselected sequences of digits to be compared with the given sequence of digits, deriving one beat of clock time from each digit in the preselected sequencies of digits, comparing the first digit in one preselected sequence with the first digit in the given sequence during one beat of clock time, comparing the second digit in the same preselected sequence with the second digit in the given sequence during the next following beat of clock time, progressively comparing each subsequent digit in the same preselected sequence with each similarly located digit in the given sequence, one set of digits at a time during each subsequent beat of clock time, and repeating the above for each preselected sequence of digits in the series.

2. A method for comparing a given sequence of digits with a series of preselected sequences of digits, which method comprises establishing a clock time of repeating beats, deriving one beat of clock time from the presence of each digit in the series of preselected sequencies of digits, comparing the first digit in one preselected sequence with the first digit in the given sequence during one beat of clock time, comparing the second digit in the same preselected sequence with the second digit in the given sequence during the next following beat of clock ime, progressively comparing each subsequent digit in the same preselected sequence with each similarly located digit in the given sequence, one set of digits at a time during each subsequent beat of clock time, registering on a counting means each set of digital matches between the given sequence and the preselected sequence being compared, triggering an alarm means when the counting means indicates that all digits in the given sequence are in matching registration with the digits in the preselected sequence being compared, resetting the counting means after each comparison of the given sequence with one of the preselected sequencs, and rpeating th above for each preselected sequence of digits in the series.

3. A method for comparing a given sequence of digits with a series of preselected sequences of digits, which method comprises recording the preselected sequences on a four track tape using an excess binary coding system, recording a marker on each track between each sequence, using the recordings of the sequences and the markers to establish a clock of repeating beats, comparing the first digit in one preselected sequence with the first digit in the given sequence during one beat of clock time, progressively comparing each subsequent digit in the said one preselected sequence with each subsequent digit in the given sequence, each comparison being made one set of digits at a time during consecutive subsequent clock beats, counting on a counting means the number of matches in the comparing of sequences, using the marker to clear the counting means after one preselected sequence has ben compared with the given sequence, repeating the comparison of the given sequence with each preselected sequence in the manner set out above, and putting into operation a self-sustaining alarm means when the counting means indicates that all digits in a preselected sequence match sequentially the digits presented in the given sequence.

4. A machine for comparing a given sequence of digits with a series of preselected sequences of digits, said machine comprising a four track precoded tape operatively mounted on a tape deck, said tape being excess binary coded with a series of preselected sequencies of digits each sequence being separated from the other sequencies by a marker on each track of the tape, means for reading the tape and supplying the read signal to four lines, an "OR" gate having an input lead connected to each of the four lines and adapted for providing an output when a signal is present on any of the four lines, an "AND" gate having an input lead connected to each of the four lines and adapted for providing an output when a marker signal is present on all of the four lines, a decode matrix connected to each of the four lines and including means for providing a signal to an output terminal when the coded number on the four lines matches a predetermined integer representative input, a card reader including a plurality of manually adjustable switches each having a center dial and each being provided with a series of integer representative contacts which are connected to each other and to integer representative contacts on the decode matrix, there being one of such switches for each digit in the given sequence of numbers, digit counting means for supplying a signal to each center dial of each switch of the card reader in registered sequence as a precodode sequence is read on the lines, said digit counting means integrally including means responsive to the output of the "AND" gate for rematching the first digit of a preselected sequence with the first digit of the given sequence each time a marker pulse is present on each of the lines, said digit counting means also integrally including timing means responsive to the output of the "OR" gate for keeping the particular digit of the precoded sequence being presented to the decode matrix in sequential registry with the particular digit of the given sequences being presented to the decode matrix through the card reader, comparison counting means operatively connected to the output of the decode matrix four counting the number of matching digits each time a preceeded sequence is compared with the given sequence, indicia means for indicating when all digits in a precoded sequence match all digits in a given sequence, and reset means for resetting the comparison counting means each time a new precoded sequence is presented to the lines, said reset means being responsive to the output of the "AND" gate and operatively connected thereto.

5. The machine of claim 4 which also includes second indicia means for indicating when all precoded sequences have been compared with the given sequence.

6. The machine of claim 4 wherein the tape is binary excess three coded.

7. The machine of claim 4 wherein the excess coding of the tape is selected to be at a value at which the decode matrix will reject the number represented by the markers on the four lines.

8. A method for comparing a given sequence of digits with a series of preselected sequences of digits, which method comprises recording the preselected series of digits on a multitrack tape having sufficient tracks that each digit may be completely recorded at one narrow increment of the tape, using the recordings of each digit to establish a clock time of the beat for each bit of recorded information, and comparing each preselected sequence of digit with the given sequence of digits one preselected sequence at a time, the digits of each preselected sequence being compared in consecutive order one digit at a time with the respectively located digit in the given sequence of digits, one complete comparison of digits being made for one beat of clock time.

9. A sequential comparator comprising timing means for deriving clock time of pulsating beats from the existence of recorded bits of information on multitrack tape, and control means for comparing a given sequence of digits with a preselected sequence of digits recorded on the multitrack tape, one digit at a time in consecutive order for each beat of clock time, said timing means and control means being self-synchronizing and independently operative notwithstanding variations of speed in tape movement.

References Cited

UNITED STATES PATENTS

| | | |
|---|---|---|
| 3,195,108 | 7/1965 | Franck. |
| 3,274,553 | 9/1966 | Oya. |
| 3,221,304 | 11/1965 | Enikeieff et al. ____ 340—149 A |
| 3,344,258 | 9/1967 | Michels _____ 340—146.2 X |
| 3,346,844 | 10/1967 | Scott et al. _____ 340—146.2 |

DONALD J. YUSKO, Primary Examiner

M. SLOBASKY, Assistant Examiner

U.S. Cl. X.R.

340—146.2, 147